United States Patent [19]

Koseki

[11] Patent Number: 4,771,436
[45] Date of Patent: Sep. 13, 1988

[54] GAS LASER OSCILLATOR HAVING A GAS FLOW SMOOTHING DEVICE TO SMOOTH GAS FLOW IN THE ELECTRICAL DISCHARGE REGION

[75] Inventor: Ryoji Koseki, Buena Park, Calif.

[73] Assignee: Amada Engineering & Service Co., Inc., La Mirada, Calif.

[21] Appl. No.: 890,345

[22] Filed: Jul. 29, 1986

[51] Int. Cl.⁴ ............................................. H01S 3/22
[52] U.S. Cl. ...................................... 372/58; 372/59; 372/61
[58] Field of Search .................. 372/58, 81, 55, 59, 372/61, 62, 34

[56] References Cited

U.S. PATENT DOCUMENTS

| | | | |
|---|---|---|---|
| 3,720,885 | 3/1973 | Koloc | 372/58 |
| 3,876,957 | 4/1975 | Thatcher | 372/38 |
| 3,970,962 | 7/1976 | Peressini et al. | 372/58 |
| 4,064,465 | 12/1977 | Hundstad et al. | 372/58 |
| 4,156,207 | 5/1979 | Reilly | 372/58 |
| 4,635,269 | 1/1987 | Reilly et al. | 372/58 |
| 4,646,310 | 2/1987 | Koseki | 372/58 |

FOREIGN PATENT DOCUMENTS 0191316 8/1986 European Pat. Off. ............. 372/58

Primary Examiner—James W. Davie
Assistant Examiner—B. Randolph
Attorney, Agent, or Firm—Wigman & Cohen

[57] ABSTRACT

A gas laser oscillator having a gas flow smoothing device, preferably made of a cylindrical mesh, installed in the gas inlet of the electrical discharge region of the oscillator.

6 Claims, 3 Drawing Sheets

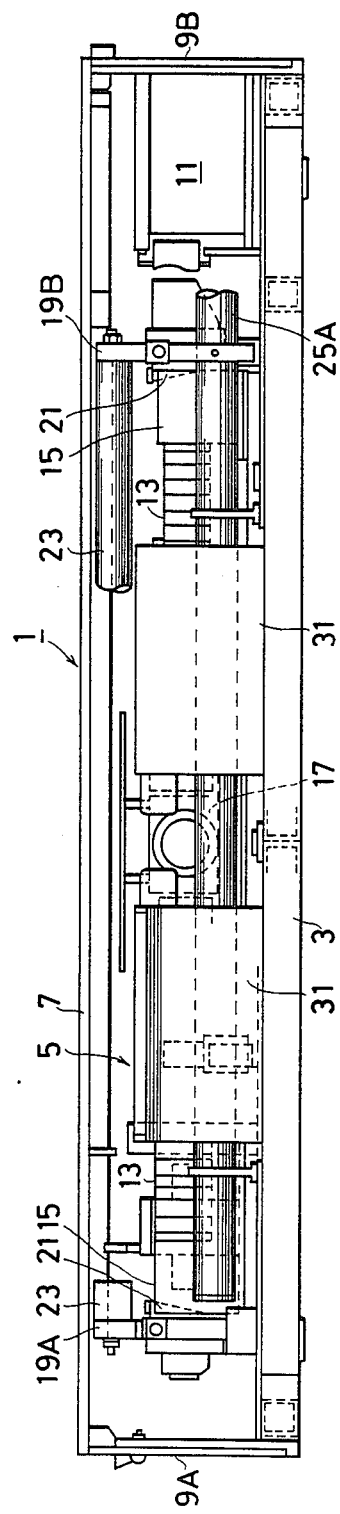
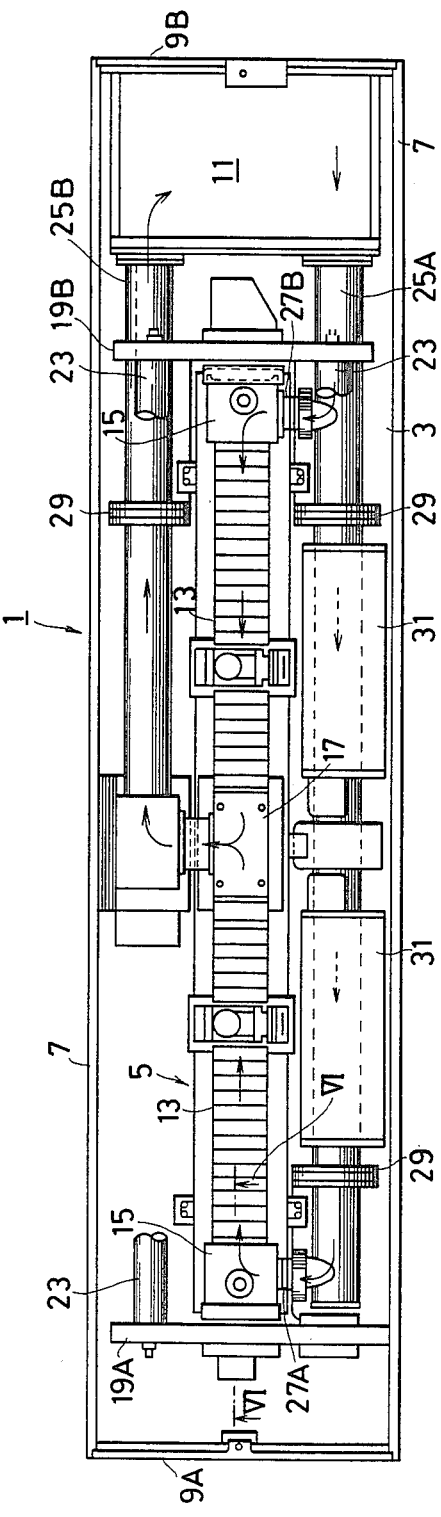

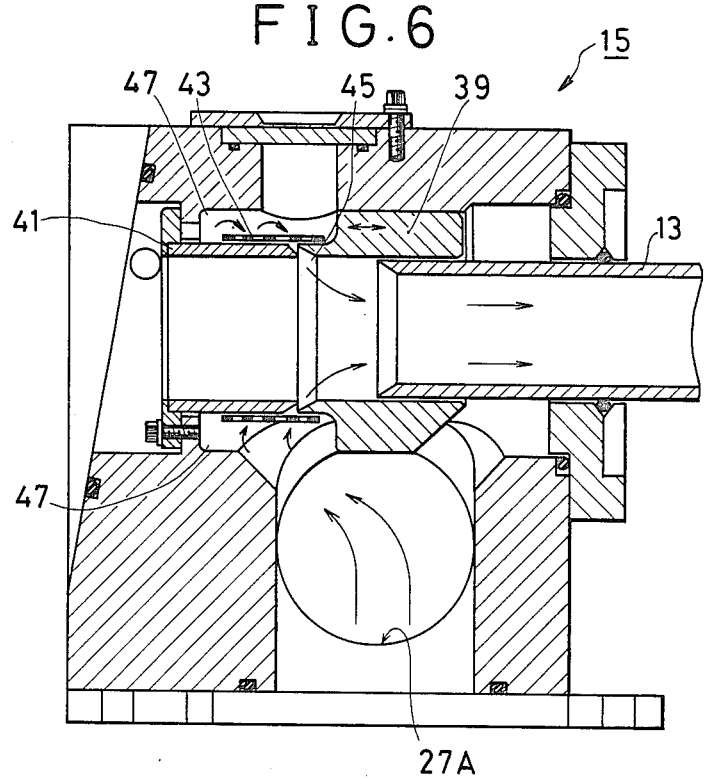

GAS LASER OSCILLATOR HAVING A GAS FLOW SMOOTHING DEVICE TO SMOOTH GAS FLOW IN THE ELECTRICAL DISCHARGE REGION

BACKGROUND OF THE INVENTION

1. Field of the Invention

This invention relates to a gas laser oscillator. More specifically, it relates to a gas flow smoothing device to smooth the gas flow in the electrical discharge region of a gas laser oscillator.

2. Description of the Related Art

High-speed axial flow gas laser oscillators are known as laser oscillators used in, for example, laser machine tools.

Comparing the high-speed axial flow gas laser oscillator to other types of gas laser oscillator, it has such characteristics as (1) it is easy to make smaller, (2) it can respond to precision cutting in single mode output. For this reason, it is widely used, particularly in machining of sheet metal.

However, in a gas laser oscillator which includes this axial flow type gas laser oscillator, the flow of gas, which is the laser medium, fluctuates considerably inside the electrical discharge region which constitutes the optical cavity, so it sometimes happens that the output beam fails to stabilize.

SUMMARY OF THE PRESENT INVENTION

One purpose of this invention is to solve the problem described above by providing a gas laser oscillator in which the flow of gas inside the electrical discharge region of the gas laser oscillator is very stable.

Another purpose of this invention is to provide a gas laser oscillator in which, since the gas flow inside the said electrical discharge region is stable, its impedance is very stable.

Another purpose of this invention is to provide a gas laser oscillator in which, when plural anode-cathode pairs are installed inside the said electrical discharge region, there is no danger that undesirable cross discharges will occur between anodes and cathodes of different pairs.

Another purpose of this invention is to provide a gas laser oscillator in which, since the impedance of the said gas flow is stable, the electrical power injected by the electrical discharges can be increased.

Another purpose of this invention is to provide a gas laser oscillator in which, since the said injected electrical power can be increased, a high output beam can be easily provided.

In order to achieve the purposes stated above, the gas laser oscillator of this invention has a gas flow smoothing device installed in the gas inlet of the electrical discharge region of the gas laser oscillator.

These and other objects, features and advantages of the present invention will be more apparent from the following description of a preferred embodiment, taken in conjunction with the accompanying drawings.

BRIEF DESCRIPTION OF THE DRAWINGS

FIG. 1 is a front view of a gas laser oscillator showing features of a conventional gas laser oscillator and also an embodiment of this invention.

FIG. 2 is a top view of the gas laser oscillator FIG. 1.

FIG. 6 is an explanatory diagram which shows a cross section of the flow control unit of a gas laser oscillator which is related to an embodiment of the present invention.

DESCRIPTION OF THE PREFERRED EMBODIMENTS

Figure 3:
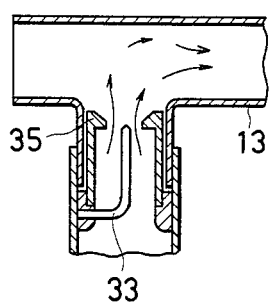
FIG. 3 and FIG. 4 are explanatory diagrams which show the gas inlet to the electrical discharge section of a conventional gas laser oscillator.

Referring to FIG. 1 and to FIG. 2, the axial flow type gas laser oscillator 1, which is related to both a conventional device and to one embodiment of the present invention, consists of a support frame 3 which supports the entire device, a discharge unit 5 in a laser oscillator section which is supported by the said support frame 3 so that it can be freely attached and removed, and a cover 7 which covers the said discharge unit 5. The support frame 3 consists of plural angle or pipe members which are connected in the longitudinal direction; side plates 9A and 9B are installed in the left and right side of this support frame 3. The cover 7 is attached to the side plates 9A and 9B so as to cover the top, front and rear of the discharge unit 5.

As is clear from FIG. 1 and FIG. 2, in order to cool the laser gas which is a mixture of $H_e$, $N_2$ and $CO_2$, which is recirculated from the laser oscillator section inside the said discharge unit 5, a relatively large main heat exchanger 11 is installed inside the side plate 9B and mounted vertically on the right-hand side of the said support frame 3. This main heat exchanger 11 has a bent tube into which a coolant such as cooling water flows and also has a large number of cooling fins, rat shown in the drawings.

The discharge unit 5 has left and right electrical discharge tubes 13 which extend left-right along the same axis, for resonance and amplification of the excited light, flow control units 15 which control the flow of laser gas to the electrical discharge tubes 13, and a manifold block 17 which couples the left and right electrical discharge tubes 13, all constructed as a integral unit. The flow control units 15 are coupled to both ends of the said left and right laser tubes 13. The flow control units 15 are also connected to the support plates 19A and 19B which are mounted vertically on the inside of the side plates 9A and 9B of the support frame 3, through the wedge-shaped brackets 21, so that they can be freely attached and removed.

The said support plates 19A and 19B extend along the front-rear direction, perpendicular to the direction along which the laser tubes 13 extend. The support plates 19A and 19B are solidly coupled by a plurality of tie rods 23.

In order to supply laser gas inside the said laser tubes 13 and to cool the laser gas which has been heated by electrical discharges inside the laser tubes 13, the laser tubes 13 are connected to the main heat exchanger 11.

A gas circulation drive device such as blower (omitted from the figure) which supplies laser gas which has been cooled in the main heat exchanger 11 to the laser tubes, is connected to the main heat exchanger 11 in an appropriate manner.

The main heat exchanger 11 is coupled horizontally to the connecting tubes 25A and 25B which are mounted parallel to the laser tubes 13. One connecting tube 25A is coupled to the right and left flow control units 15 which are supported by the support plates 19A and 19B through the cylindrical joint members 27A and 27B. The other connecting tube 25B is coupled to the manifold block 17.

The connecting tubes 25A and 25B are supported by a plurality of support blocks 29 which are mounted vertically on the support frame 3.

Laser gas which is cooled by the said main heat exchanger 11 is supplied to the left and right flow control units 15 through the connecting tube 25A and the cylindrical joint members 27A and 27B, as shown by the arrows in FIG. 2. The laser gas supplied to the left and right flow control units 15 flows into the left and right laser tubes 13, respectively, as shown by the arrows. At a plurality of locations inside the left and right laser tubes 13, pairs of anodes and cathodes, to be described further below, are installed to produce electrical discharges in the laser gas. To cool the laser gas in the laser tubes 13, the laser gas inside the left and right laser tubes 13 converges inside the manifold block 17. The laser gas which has come together inside the said manifold block 17 passes through the other connecting tube 25B and is recirculated to the main heat exchanger 11 where it is cooled again. The laser gas then repeats the same circuit over and over as described above.

A heat exchanger 31 with an air cooling fan is located inside the laser oscillator 1 on the connecting tube 25A side to cool the inside of the laser oscillator 1 which is covered by the cover 7.

In addition, to reflect the light which is emitted by the electrical discharge tubes 13, an output mirror and rear mirror, respectively, are supported by the said support plates 19A and 19B (not shown in the figure).

However, in previously used gas oscillators there has been a problem. Inside the flow control units 15, for example, the anode pin 33 shown in FIG. 3 and the nozzle 35 can be moved slightly up and down with respect to the joint members 27A and 27B in the same figure. By moving the said nozzle 35 up and down by means of a drive device (not shown in the figure), the flow rate of gas into the electrical discharge tubes is adjusted to the desired value. However, in a flow control unit with this configuration, the gas flow is bent at a right angle at the inflow location, which gives rise to a non-uniform flow. In addition, turbulent flow is produced by the nozzle 35.

Figure 4:
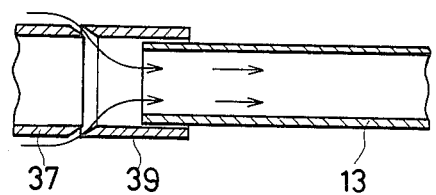

In addition, in another conventional configuration of the flow control unit 15, as shown in FIG. 4 an anode ring 37, and a flow control valve 39 which is mated to the said electrical discharge tube so that it is free to slide, are installed inside the unit. In this previous configuration, there is no danger of turbulent flow being produced where the gas flows in, but the open area of the nozzle is large, so that turbulence produced in the gas flow before it flows in is introduced as it is into the electrical discharge section. As a result the gas flow in the said electrical discharge section is unstable.

Moreover, the instability of inflowing gas in the flow control unit of a previous laser such as those shown in FIG. 3 and FIG. 4 produces instability of the impedance of the said gas flow; consequently, cross-discharges occurs between the plurality of anodes and cathodes which are installed in pairs inside the electrical discharge tubes.

Figure 5:
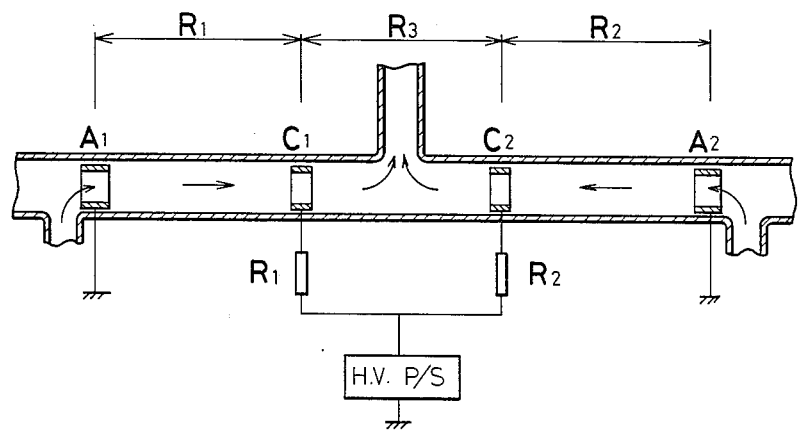
FIG. 5 is an explanatory diagram which shows the arrangement of anodes and cathodes in the electrical discharge section and also the power supply circuit of a gas laser oscillator according to both a conventional device and to one embodiment of the present invention.

Now referring to FIG. 5, these cross discharges will be explained. In an axial flow type gas laser oscillator, the electrical discharge tubes are long and narrow, so that it is usual for the plurality of anode-cathode pairs $A_1$—$C_1$, $A_2$—$C_2$ etc. inside the said electrical discharge tubes to be arranged in a line. Then, for example, a high voltage power supply HV is connected to these cathode terminals through the ballast resistors $R_1$, $R_2$, . . .

In this configuration, when the gas flow inside the electrical discharge tubes is smooth and the impedance of the gas flow is uniform within the electrical discharge tubes, electrical discharges only occur between paired anodes and cathodes such as $A_1$—$C_1$ and $A_2$—$C_2$, and a laser beam of stable power is output. Even if the input electrical power is increased, this condition is maintained. However, if the above-described turbulence occurs in the gas flow, causing instability to occur in the gas flow impedance, it is possible, for example, for the gas impedance between cathode $C_1$ and anode $A_2$ to become very low, so that an electrical discharge occurs between the said cathode $C_1$ and anode $A_2$. The danger of this happening is very great when relatively large electrical power is input to the gas. This is called a cross-discharge. When such a cross-discharge occurs, the gas impedance between the cathode $C_1$ and the anode $A_1$ increases so that the voltage necessary for an electrical discharge between the said electrodes becomes larger than the maintenance voltage, the electrical discharge stops and the output beam becomes unstable. Consequently, for some time now there has been a strong demand for technology that would smooth the gas flow inside these electrical discharge tubes.

Next, referring to FIG. 6, the flow control unit 15 of a gas laser oscillator, which relates to the present invention, will be described in detail.

As discussed above, the laser gas inside the connecting tube 25A is supplied to the inside of the flow control unit 15 through the cylindrical joint member 27A as shown by the arrows. Inside the flow control unit 15, a ceramic cylindrical flow control valve 39 and an anode ring 41 are installed facing each other along the axial direction of the electrical discharge tube 13. Around the outer circumference of the parts of this flow control valve 39 and anode ring 41 that face each other, a gas flow smoothing device 43, made of meshed cylindrical metal, is installed. In addition, the electrical discharge tube 13 penetrates almost to the center of the flow control valve 39 which is installed inside the flow control unit 15.

The flow control valve 39 can be moved slightly in the axial direction of the said electrical discharge tube by a drive device which is not shown in the figure. Consequently, when the flow control valve 39 is moved toward the left in the figure, an annular gap 45 is formed between the said flow control valve 39 and the anode ring 41. The structure is such that just the right amount of laser gas will then flow from this annular gap 45 inside the electrical discharge tube, as shown by the arrows.

Inside the flow control unit 15, the flow control valve 39 is mounted in a suitable manner on a support section which is formed approximately in the center of the flow control unit 15. Around this support section, the gas chamber 47, connects in a suitable manner to the cylindrical joint member 27a. Inside the gas chamber 47, the flow control valve 39 and the anode ring 41 are mounted facing each other. Consequently, the laser gas passes through the connecting tube 25A and the cylindrical joint member 27A, and is supplied to the gas chamber 47.

The laser gas which is supplied to the said gas chamber 47 passes through the mesh openings in the gas flow smoothing member 43 and then flows smoothly and uniformly into the inside of the electrical discharge tube 13 from the entire circumference of the annular gap 45 which has been formed with just the right amount of opening between the flow control valve 39 and the anode ring 41.

Next, the action of the said gas flow smoothing device 43 will be explained in detail. The gas flow from the No. 1 gas chamber 47 into the inside of the electrical discharge tube 13 passes through the mesh openings of the smoothing device 43 into the gap 45. Consequently when the inflow occurs, turbulence is not generated. In addition, turbulence which has been generated in the joint members 27A and 27B and the gas chamber 47 is smoothed by the smoothing device 43, and so does not pass through to the inside of the electrical discharge tube 13. Consequently, inside the electrical discharge tube 13, the gas flow has very smooth velocity variations, without turbulence.

Also, since gas impedance fluctuations do not occur, when electrical discharges are produced inside the said laser gas, there is no danger of the undesirable cross discharges occurring, which makes it possible to input large electrical power and obtain a high-output laser beam.

Although the invention has been described in its preferred embodiments, it is to be understood that various changes and modifications may be made within the purview of the appended claims without departing from the true scope and spirit of the invention in its broader aspects.

What is claimed is:

1. An axial flow type gas laser oscillator comprising:
   an electrical discharge tube having an inlet having an outer circumference and an annular gap for introducing a gas flow to the inside thereof, and an outlet;
   a pair of electrodes, installed along the longitudinal length of said electrical discharge tube with predetermined separation length, for producing an electric discharge inside the gas flow supplied to said electrical discharge tube;
   an optical cavity defined by a pair of mirrors and extending through the inside of said electrical discharge tube;
   a heat exchanger for cooling the gas flow which is heated by the electric discharge produced between said pair of electrodes, said heat exchanger having an inlet and an outlet;
   a first connecting tube, connecting the outlet of said electrical discharge tube with the inlet of said heat exchanger, for guiding the heated gas flow to said heat exchanger;
   a second connecting tube, connecting the outlet of said heat exchanger with the inlet of said electrical discharge tube, for guiding the cooled gas flow to said electrical discharge tube;
   a flow control unit provided at the inlet of said electrical discharge tube, said flow control unit comprising:
   (a) a flow control valve, slidably fitted around the outer circumference of said electrical discharge tube where the annular gap is formed, for changing the size of the annular gap, said flow control valve also having an outer circumference; and
   (b) a gas flow smoothing device, provided around the outer circumference of the flow control valve, for covering the annular gap and smoothing the gas flow flowing into the said electrical discharge tube through the annular gap.

2. The gas oscillator of claim 1 wherein said gas flow smoothing device comprises a meshed member.

3. The gas laser oscillator of claim 2 wherein said gas flow smoothing device comprises a cylindrical member having an inner diameter approximately equal to the outer diameter of the inlet of said electrical discharge tube and in addition is mated to said inlet of the electrical discharge tube so that the annular gap for introducing a gas flow to the inside thereof is completely covered by said gas flow smoothing device.

4. The gas laser oscillator of claim 3 wherein said gas flow smoothing device is made of metal.

5. The gas laser oscillator of claim 1 wherein one of said pair of electrodes comprises a tubular anode ring positioned in axial alignment with the inlet of said electrical discharge tube to form a part of said annular gap for introducing a gas flow to the inside of said electrical discharge tube, wherein said tubular anode ring has an outer circumference, and wherein said gas flow smoothing device is also provided around the outer circumference of said tubular anode ring.

6. The gas laser oscillator of claim 3 wherein one of said pair of electrodes comprises a tubular anode ring positioned in axial alignment with the inlet of said electrical discharge tube to form a part of said annular gap for introducing a gas flow to the inside of said electrical discharge tube, wherein said tubular anode ring has an outer circumference approximately equal to the inner diameter of the gas flow smoothing device which is in addition mated to the anode ring so that the annular gap for introducing a gas flow to the inside of said electrical discharge tube is completely covered by said gas flow smoothing device.

* * * * *